(12) United States Patent
Atchison et al.

(10) Patent No.: US 8,700,601 B2
(45) Date of Patent: Apr. 15, 2014

(54) METHODS, SYSTEMS, AND PRODUCTS FOR MANAGING ELECTRONIC FILES

(75) Inventors: Charles Atchison, Alpharetta, GA (US); Michelle Randolph, McDonough, GA (US); Goutham Belliappa, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1078 days.

(21) Appl. No.: 12/136,183

(22) Filed: Jun. 10, 2008

(65) Prior Publication Data

US 2008/0313155 A1    Dec. 18, 2008

Related U.S. Application Data

(63) Continuation of application No. 11/068,176, filed on Feb. 28, 2005, now Pat. No. 7,398,281.

(51) Int. Cl.
    *G06F 7/00*      (2006.01)
    *G06F 17/30*     (2006.01)

(52) U.S. Cl.
    USPC ........................................................ 707/711

(58) Field of Classification Search
    USPC ........................................................ 707/711
    See application file for complete search history.

(56) References Cited

U.S. PATENT DOCUMENTS

| | | | |
|---|---|---|---|
| 6,463,440 B1 | 10/2002 | Hind | |
| 6,499,665 B1 | 12/2002 | Meunier | |
| 6,654,734 B1 | 11/2003 | Mani | |
| 6,820,094 B1 | 11/2004 | Ferguson | |
| 7,092,938 B2 * | 8/2006 | Brown et al. | 707/709 |
| 2003/0048921 A1 * | 3/2003 | Cahill et al. | 382/100 |
| 2003/0093790 A1 * | 5/2003 | Logan et al. | 725/38 |
| 2004/0236801 A1 * | 11/2004 | Borden et al. | 707/204 |
| 2006/0173430 A1 * | 8/2006 | Lee et al. | 604/368 |
| 2006/0195465 A1 * | 8/2006 | Atchison et al. | 707/102 |

* cited by examiner

*Primary Examiner* — Kuen Lu
(74) *Attorney, Agent, or Firm* — Scott P. Zimmerman, PLLC

(57) ABSTRACT

Methods, systems, and products are disclosed for managing electronic files in a document repository. An electronic file is associated to the document repository, and data is extracted from the electronic file. A document repository index is created. An overwrite protection function is implemented that appends a date and time to the electronic file when the electronic file already exists within the document repository, such that the date and time distinguishes the electronic file from other electronic files. The document repository index is stored in memory that points to a subfolder within an unchangeable primary folder.

16 Claims, 27 Drawing Sheets

METHODS, SYSTEMS, AND PRODUCTS FOR MANAGING ELECTRONIC FILES

CROSS-REFERENCE TO RELATED APPLICATIONS

This application is a continuation of U.S. application Ser. No. 11/068,176, filed Feb. 28, 2005, now issued as U.S. Pat. No. 7,398,281, and incorporated herein by reference in its entirety.

NOTICE OF COPYRIGHT PROTECTION

A portion of the disclosure of this document and its figures contain material subject to copyright protection. The copyright owner has no objection to the facsimile reproduction by anyone of this document, but otherwise reserves all copyrights whatsoever.

BACKGROUND

The exemplary embodiments relate to the field of a document repository, and more particularly, to storing, reformatting, indexing, retrieving, and/or otherwise managing electronic documents.

Most organizations try to manage a tremendous volume of electronic files, such as text-based documents, audio and/or video files, graphical images, and other digital data. Oftentimes, the tasks of organizing, searching, and accessing these electronic files is time consuming and costly. While the computer industry has responded with many document management systems, these systems are often difficult to deploy across the organization, require significant training, and present challenges when trying to access the system from a computer outside of the organization, such as trying to access and make changes to an electronic file from a home computer.

Consequently, needs exist to continue to improve document management systems. For example, with so many organizations utilizing the world wide web, intranet, and/or extranet, needs exist to leverage these evolving communications networks to enable an authorized user to quickly search for, identify, and access electronic files. Still another challenge with the evolution of communications networks is to securely store electronic files on a local device that is accessible from any communications device within the organization, including communications devices in other geographic locations.

SUMMARY

The exemplary embodiments include methods, systems, computer programs, and/or computer program products for providing a document repository tool that easily and quickly provides a document repository that is accessible and/or manageable from any authorized communications device.

According to some of the embodiments, a method for providing the document repository tool includes identifying an electronic file to index in a document repository of a communications network, extracting data of the electronic file to create a document repository index, and storing the document repository index to a memory device of the communications network. The document repository index may include parameters for searching for the electronic file. For example, the search parameter may include a text parameter of associated text data of the electronic file, a file name parameter having at least a portion of a file name of the electronic file, a storage location parameter associated with a storage location of the electronic file in the communications network, a title name parameter having at least a portion of a title of the electronic file, an author parameter having a name of an author of the electronic file, an editor parameter having a name of an editor of the electronic file, a date parameter having a date associated with the electronic file, a time parameter having a time associated with the electronic file, an audio parameter of associated audio data of the electronic file, and/or a video parameter of associated video data of the electronic file. In an exemplary embodiment, a user accesses a web-based document repository module that controls access to and management of the document repository. In further exemplary embodiments, the method includes receiving a search parameter to search data of the document repository index for the electronic file. If the search parameter matches data of the document repository index, then the method continues and presents a search result to identify the electronic file matching the search parameter. And, if the search parameter does not match data of the document repository index, then the method continues and presents a message to identify the search parameter was not successfully matched. Thereafter, the selected electronic file may be retrieved and presented to a communications device of a user.

According to some of the other embodiments, a storage medium (e.g., computer program code) includes instructions for associating an electronic file to index in a document repository of a communications network, extracting data of the electronic file to create a document repository index, and storing the document repository index to a memory device of the communications network. The document repository index may include a text parameter of associated text data of the electronic file, a file name parameter having at least a portion of a file name of the electronic file, a storage location parameter associated with a storage location of the electronic file in the communications network, a title name parameter having at least a portion of a title of the electronic file, an author parameter having a name of an author of the electronic file, an editor parameter having a name of an editor of the electronic file, a date parameter having a date associated with the electronic file, a time parameter having a time associated with the electronic file, an audio parameter of associated audio data of the electronic file, and/or a video parameter of associated video data of the electronic file. Further exemplary embodiments include instructions for communicating with a web-based document repository module that controls access to and management of the document repository. Still further, other exemplary embodiments include instructions for using the document repository module to copy, edit, delete, store, compress, uncompress, link, re-format, or administer at least one of the electronic file and the document repository index.

According to additional exemplary embodiments, a document repository system includes a database of at least one electronic file, an electronic file server for accessing and communicating a document repository index within a communications network, and at least one processing device in communication with the electronic file server. The processing device includes a document repository module having the document repository index. And, similar to the above exemplary embodiments, the document repository index may include a text parameter of associated text data of the electronic file, a file name parameter having at least a portion of a file name of the electronic file, a storage location parameter associated with a storage location of the electronic file in the communications network, a title name parameter having at least a portion of a title of the electronic file, an author parameter having a name of an author of the electronic file, an editor parameter having a name of an editor of the electronic file, a date parameter having a date associated with the electronic file, a time parameter having a time associated with the electronic file, an audio parameter of associated audio data of the electronic file, and/or a video parameter of associated video data of the electronic file.

Other systems, methods, and/or computer program products according to the exemplary embodiments will be or become apparent to one with skill in the art upon review of the following drawings and detailed description. It is intended that all such additional systems, methods, and/or computer program products be included within and protected by this description and be within the scope of this invention.

DESCRIPTION OF THE DRAWINGS

The above and other embodiments, objects, uses, advantages, and novel features are more clearly understood by reference to the following description taken in connection with the accompanying figures, wherein.

DETAILED DESCRIPTION

Figure 1:
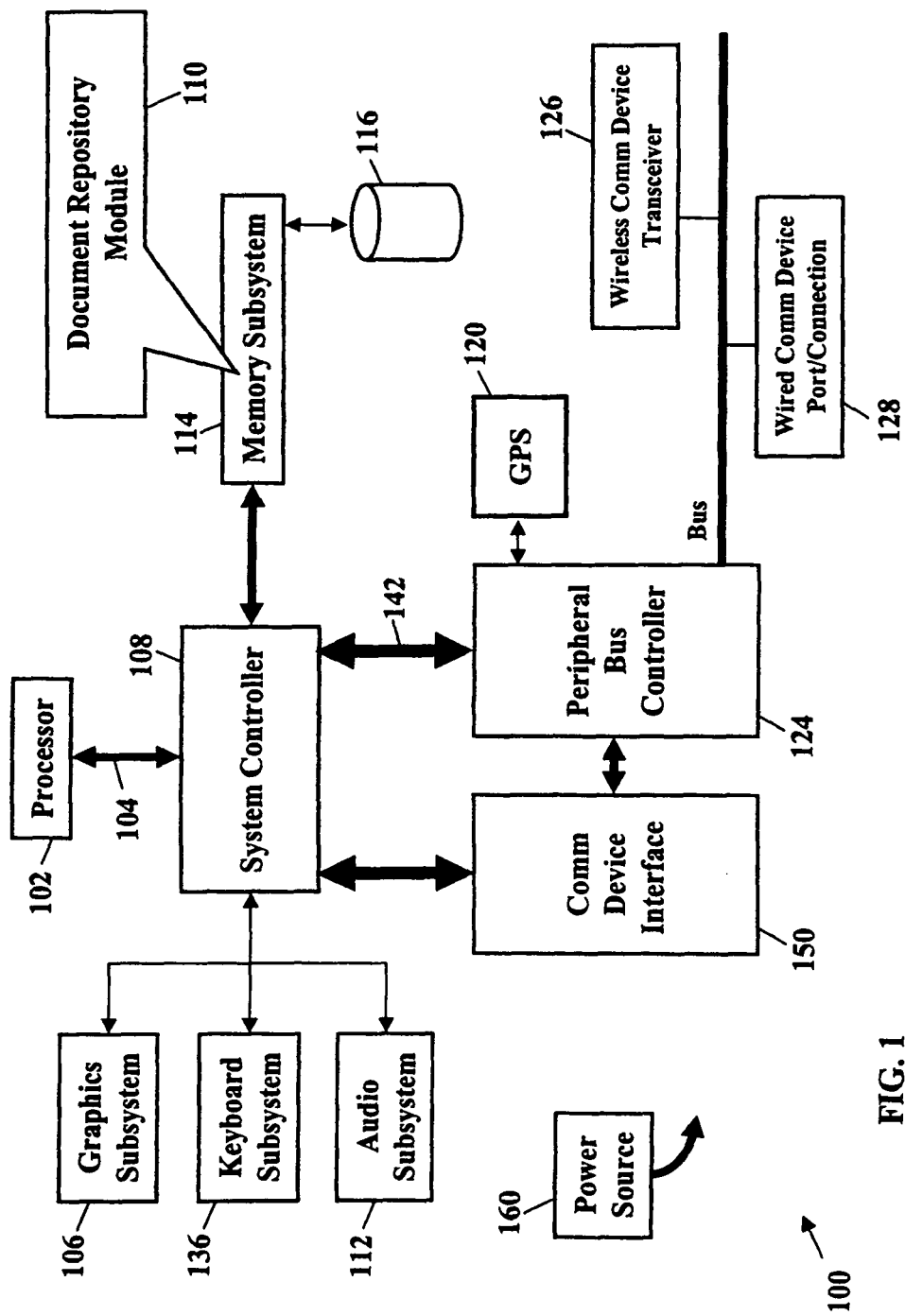
FIG. 1 illustrates a block diagram of exemplary details of a communications device having a document repository module according to some exemplary embodiments.

The exemplary embodiments now will be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting exemplary embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, illustrations, graphical user interfaces, and the like represent conceptual views or processes illustrating systems, methods and computer program products embodying this invention. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

According to some of the exemplary embodiments, methods, systems, computer programs, and/or computer program products provide a document repository tool that easily and quickly searches, accesses, and otherwise manages electronic files from any authorized communications device in a communications network. For example, using an interactive graphical user interface (GUI), a user may select an electronic file to index in a document repository of a communications network, the document repository tool then automatically extracts data of or associated with the electronic file to create a document repository index. Thereafter, the user may input or select a search parameter to search for the electronic file. For example, the search parameter may include a text parameter of associated text data of the electronic file, a file name parameter having at least a portion of a file name of the electronic file, a storage location parameter associated with a storage location of the electronic file in the communications network, a title name parameter having at least a portion of a title of the electronic file, an author parameter having a name of an author of the electronic file, an editor parameter having a name of an editor of the electronic file, a date parameter having a date associated with the electronic file, a time parameter having a time associated with the electronic file, an audio parameter of associated audio data of the electronic file, and/or a video parameter of associated video data of the electronic file. If the search parameter matches data of the document repository index, then a search result identifying the electronic file that matches the search parameter is presented to the user. Thereafter, the selected electronic file may be retrieved and presented to a communications device of a user. And, if the search parameter does not match data of the document repository index, then a message that indicates the search parameter was not successfully matched is presented to the user.

Some of the advantages of the document repository include providing a central location to store files related to one project or many projects that are accessible over a world wide communications network, intranet, and/or internet and providing a database to store electronic files stored to a local memory device (e.g., a personal computer) and access these electronic files anywhere within an organization's communications network.

As used herein, the term "electronic file" includes any electronic information, such as, for example video, text, audio, and/or voice in a variety of formats, such as word processing documents, spreadsheets, other text-based documents, dual tone multi-frequency, digital, analog, and/or others. Additionally, the term "electronic file" may include: (1) executable programs, such as a software application, (2) an address, location, and/or other identifier of the storage location, and (3) integrated or otherwise combined electronic files, such as a grouping of project related files or user specific files. According to an exemplary embodiment, the electronic file is communicated to a communications address that may be an electronic data communications address, such as an email address, webpage, and/or an Internet Protocol (IP) associated address, and/or may be a telecommunications address, such as a telephone number or a communications address utilizing any frequency in the electromagnetic spectrum (e.g., short wave radio receiver), and, then the electronic file may be presented to the communications device.

Referring now to the figures, FIG. 1 is a block diagram showing an exemplary document repository module 110 residing in communications device 100. The communications device 100 may include a personal computer system, a cellular phone, an interactive pager, a personal digital assistant (PDA), a Voice over Internet Telephony (VoIP) phone, a global positioning system (GPS), and any device having a digital signal processor (DSP). As FIG. 1 shows, the document repository module 110 operates within a system memory device. The document repository module 110, for example, is shown residing in a memory subsystem 114. The document repository module 110, however, could also reside in flash memory or a peripheral storage device 116. The communications device 100 also has one or more central processors 102 executing an operating system. As one skilled in the art would appreciate, the operating system has a set of instructions that control the internal functions of the communications device 100, and furthermore has the capability to communicate a communications signal among the communications device 100, a communications network (e.g., reference numeral 210 in FIG. 2), and/or a connected electronic device capable of communicating audio, graphical, and/or other sensory data.

The system controller 108 provides a bridging function between the one or more central processors 102, and a video/graphics subsystem 106, an input terminal 112, and an audio subsystem 118, the memory subsystem 114, a PCI (Peripheral Controller Interface) bus, and a Communications ("Comm") Device Interface 150. The PCI bus is controlled by a Peripheral Bus Controller 124. The Peripheral Bus Controller 124 (typically called a "Southbridge") is an integrated circuit that serves as an input/output hub for various peripheral ports and/or transceivers. The Peripheral Bus Controller 124 allows for communications with the communications network and any connected electronic device. The peripheral ports allow the communications device 100 to communicate with a variety of devices through networking ports (such as SCSI or Ethernet, not shown) and/or transceivers that include Wireless Communications ("Comm") Device Transceiver 126 (for communication of any frequency signal in the electromagnetic spectrum, such as, for example, Wireless 802.11 and Infrared) and Wired Communications ("Comm") Device Port/Connection 124 (such as modem V90+ and compact flash slots). These peripheral ports could also include other networking ports, such as, a serial port (not shown) and/or a parallel port (not shown). Further, the communications device 100 may include a power source 160, such as a power cord that plugs into an electrical socket, a rechargeable battery to provide power and allow the communications device 100 to be portable, and/or others. Additionally, those of ordinary skill in the art understand that the program, processes, methods, and systems described herein are not limited to any particular computer system or computer hardware.

Those of ordinary skill in the art also understand the central processor 102 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described herein are not limited to any particular central processor of a manufacturer.

The operating system may be a UNIX® operating system (UNIX® is a registered trademark of the Open Source Group, www.opensource.org). Other UNIX-based operating systems, however, are also suitable, such as LINUX® or a RED HAT® LINUX-based system (LINUX® is a registered trademark of Linus Torvalds, and RED HAT® is a registered trademark of Red Hat, Inc., Research Triangle Park, N.C., 1-888-733-4281, www.redhat.com). Other operating systems, however, are also suitable. Such other operating systems may include a WINDOWS-based operating system (WINDOWS® is a registered trademark of Microsoft Corporation, One Microsoft Way, Redmond Wash. 98052-6399, 425.882.8080, www.Microsoft.com) and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described herein are not limited to any particular operating system.

According to an exemplary embodiment, the document repository module 110 in the memory subsystem 114 operates with the processor 102 to create an index of one or more electronic files that are available to a user. In order to search for an electronic file, the processor 102 either receives one or more search parameters via signals from the input terminal 112, the wireless transceiver 126, and/or a device coupled or otherwise connected with the wired port/connection 128. Further, the system memory device may cooperate with the operating system and with other input/output devices (e.g., the graphics subsystem 106, the input terminal 112, and/or the audio subsystem 118) to provide the graphical user interface (GUI) of the document repository modules 110. The graphical user interface provides a convenient visual and/or audible interface with the communications device 100. For example, the document repository module 110 provides a GUI that enables the user to search, save, re-format, manipulate, retrieve, index, and/or otherwise manage the electronic file.

Figure 2:
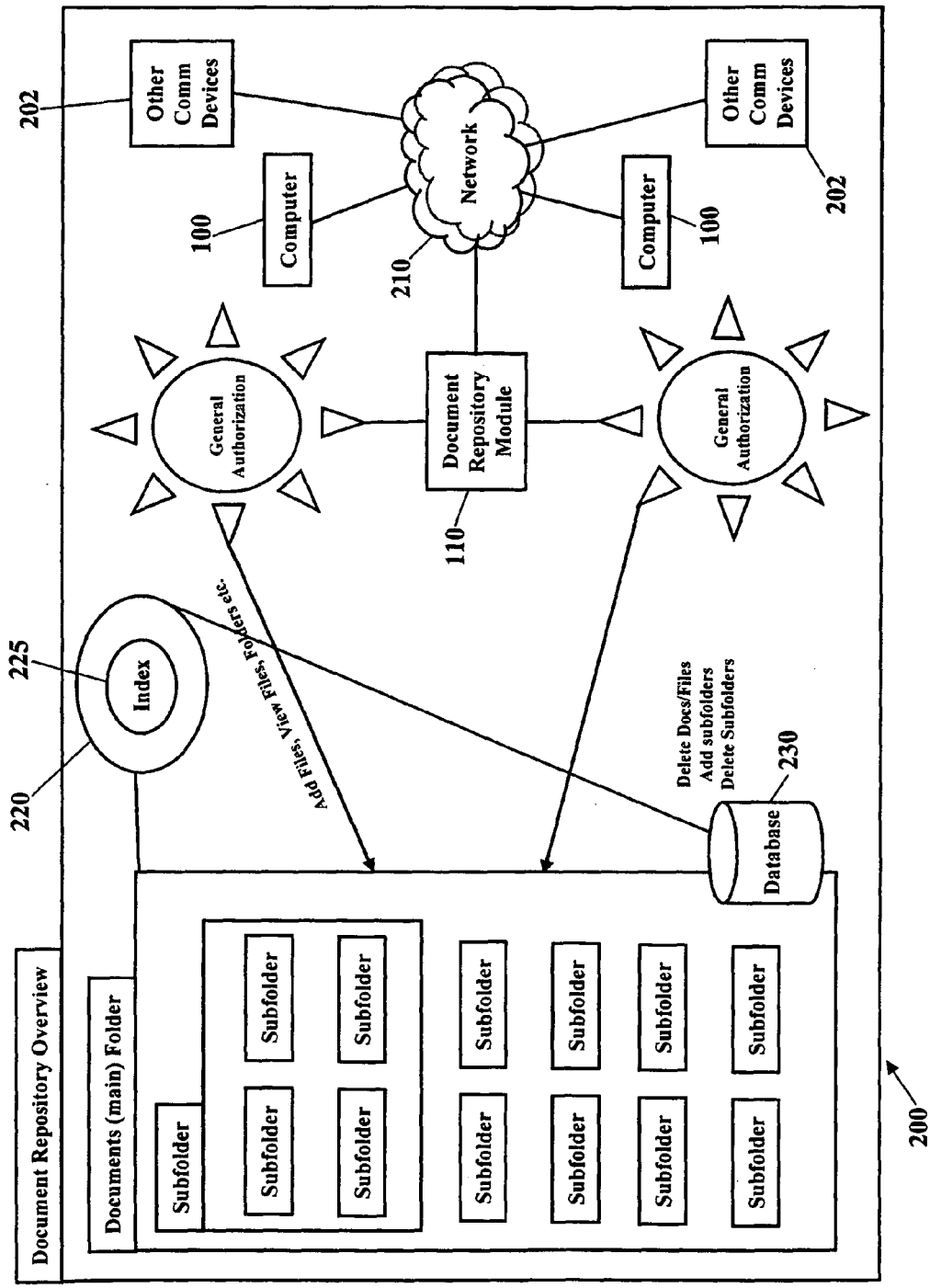
FIG. 2 illustrates an exemplary operating environment for a document repository system that include at least one communications device accessing a network-based document repository module according to some exemplary embodiments.

Referring now to FIG. 2, the document repository module 110 may operate in a communications network 210 having at least one communications device 100, 202, a file server 220 with access to a document repository index 225, and a database 230 of electronic files. The communications device 202 may include a cellular phone, an interactive pager, a personal digital assistant (PDA), a Voice over Internet Telephony (VoIP) phone, a computer system, a global positioning system (GPS), a control panel integrated into a piece of furniture such as a couch, chair, or table, and any device having a digital signal processor (DSP). The communications devices 202 may further include a watch, a radio, vehicle electronics, a clock, a printer, a gateway, and/or another apparatus and system having an AV output. Because the communications devices 202 may have limited capabilities, the document repository module 110 may access a remote database to order, access, and/or otherwise manage the electronic file and the document repository index 225.

The document repository module 110 is a tool that allows the user to create an index 225 pointing to a main folder 240 having different folders 241, 244, 248 and subfolders 242, 243, 245, 246, 248 to store one or more electronic files. According to an exemplary embodiment, the document repository module 110 includes two levels of password protection for access to the repository. The levels are a general access and an administrative access. The general access user may add and/or access files, folders 231, 234, 238, and subfolders, 242, 243, 245, 246, 248. The administrative access user may add, delete, re-format, manipulate, access, enable or disable overwrite protection, and/or otherwise manage files, folders 231, 234, 238, and subfolders, 242, 243, 245, 246, 248.

The document repository index 225 includes one or more search parameters for searching for and identifying an electronic file of the document repository. For example, the search parameter may include a text parameter of associated text data of the electronic file, a file name parameter having at least a portion of a file name of the electronic file, a storage location parameter associated with a storage location of the electronic file in the communications network, a title name parameter having at least a portion of a title of the electronic file, an author parameter having a name of an author of the electronic file, an editor parameter having a name of an editor of the electronic file, a date parameter having a date associated with the electronic file, a time parameter having a time associated with the electronic file, an audio parameter of associated audio data of the electronic file, and/or a video parameter of associated video data of the electronic file. If the search parameter matches data of the document repository index, then a search result identifying the electronic file that matches the search parameter is presented to the user. Thereafter, the selected electronic file may be retrieved and presented to a communications device of a user. And, if the search parameter does not match data of the document repository index, then a message that indicates the search parameter was not successfully matched is presented to the user. Table 1 below presents a list of exemplary search parameters that may be used to search for and/or identify an electronic file.

TABLE 1

Document Repository Search Parameters

| Field Name | Field Type | Description |
| --- | --- | --- |
| Access | Date/Time | Last time file was accessed. |
| Characterization | Text/String | Characterization, or abstract, of document automatically created by indexing. |
| Create | Date/Time | Time file was created. |
| Directory | Text/String | Physical path to the file, not including the file name. |
| DocAppName | Text/String | Name of application that created the file. |
| DocAuthor | Text/String | Author of the document. |
| DocByteCount | Numeric | Number of bytes in the document. |
| DocCategory | Text/String | Type of document, such as a memo, schedule or white paper. |
| DocCharCount | Numeric | Number of characters in the document. |
| DocComments | Text/String | Comments about the document. |
| DocCompany | Text/String | Name of the company for which the document was written. |
| DocCreatedTm | Date/Time | Time document was created. |
| DocEditTime | Date/Time | Total time spent editing document. |
| DocHiddenCount | Numeric | Number of hidden slides or characters in an electronic file. |
| DocKeywords | Text/String | Document keywords. |
| DocLastAuthor | Text/String | Most recent user who edited the document. |
| DocLastPrinted | Date/Time | Time document was last printed. |
| DocLastSavedTm | Date/Time | Time document was last saved. |
| DocLineCount | Numeric | Number of lines contained in a file. |
| DocManager | Text/String | Name of the manager of the file's author. |
| DocNoteCount | Numeric | Number of pages with notes in the electronic file |
| DocPageCount | Numeric | Number of pages in the electronic file. |
| DocParaCount | Numeric | Number of paragraphs in the electronic file. |
| DocPartTitles | Text/String | Names of document parts. For example, in Microsoft Excel, a spreadsheet is a document part. In PowerPoint, a slide is a document part. And, in Word, the file names of the documents contained in a master document are document parts. |
| DocPresentationTarget | Text/String | Target format (35 mm, printer, and video, and others). |
| DocRevNumber | Text/String | Current version number of the electronic file. |
| DocSlideCount | Numeric | Number of slides the electronic file. |
| DocSubject | Text/String | Subject of the electronic file. |
| DocTemplate | Text/String | Name of the template for the electronic file. |
| DocTitle | Text/String | Title of the electronic file. |
| DocWordCount | Numeric | Number of words in the electronic file. |
| FileIndex | Numeric | Unique ID of the file. |
| FileName | Text/String | Name of the file. |
| HitCount | Numeric | Number of hits (words matching query) in the file. |
| Path | Text/String | Full physical path to the file, including file name. |
| Rank | Numeric | Rank of row. Ranges from 0 to 1000, larger numbers indicate better matches to search parameter(s). |
| ShortFileName | Text/String | Short (8.3) file name. |
| Size | Numeric | Size of file, in bytes. |
| VPath | Text/String | Full virtual path to file, including file name. If more than one possible path, then the best match for the specific query is chosen. |
| Write | Date/Time | Last time file was written. |

According to an exemplary embodiment, the document repository index 225 uses a folder/subfolder or catalog to locate an indexed electronic file. For example, the document repository index 225 may point to a folder that has a structure similar to "\\UniqueFolderNameDoNotChange\Electronic Files" within a selected knowledgebase folder. Any folder stored under the "\Electronic Files" is indexed and searchable. Further, the "UniqueFolderNameDoNotChange" folder is a primary folder and should not be changed since the document repository module 110 uses this folder as a starting point for creating the index 225. According to an exemplary embodiment, the document repository module 110 may execute all functions with the required authorization using simple file system commands.

Figure 3:
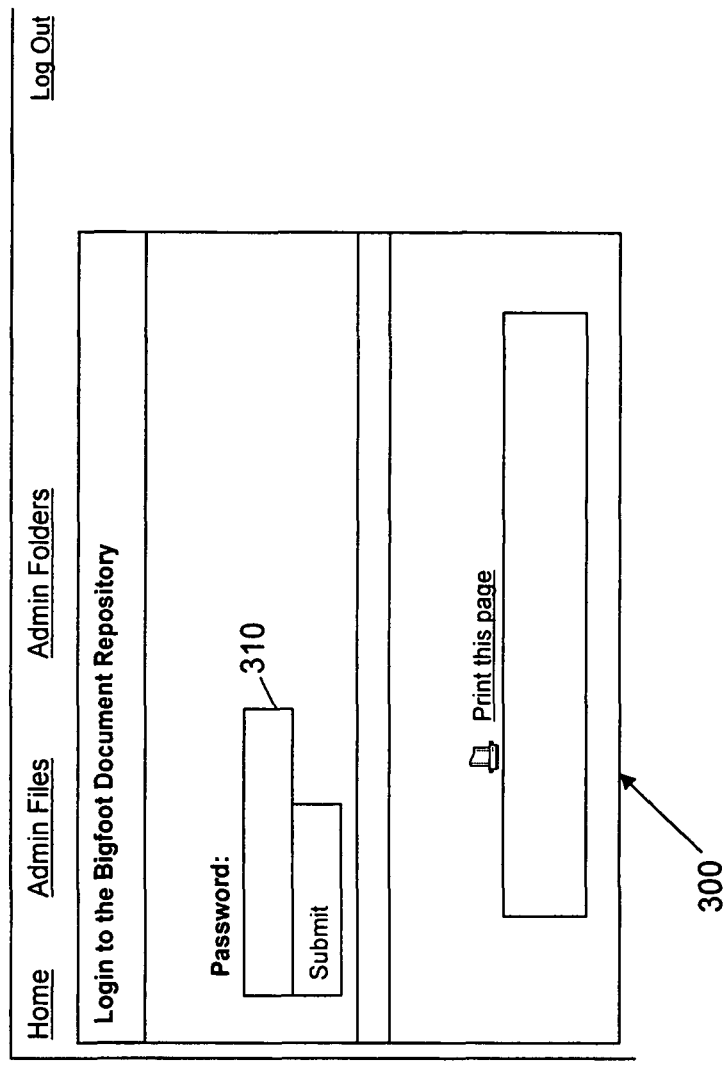
FIGS. 3-27 illustrate Graphical User Interfaces (GUIs) of a document repository module according to some exemplary embodiments.

An exemplary overview of the document repository module 110 will now be discussed with reference to FIGS. 3-28. FIG. 3 illustrates an exemplary document repository login or entry screen 300. The login screen prompts the user to enter a password 310 to verify the user and to prevent unauthorized access. If the password is accepted, then the user is presented the home page GUI 400 of FIG. 4. The home page 400 provides a list of one or more folders and/or subfolders 410 and provides a number of one or more electronic files 415 in each of the folders and/or subfolders 410. In addition, the home page presents a link to an electronic file search page 420 (referred to in FIG. 4 as "Document Search").

Figure 4:
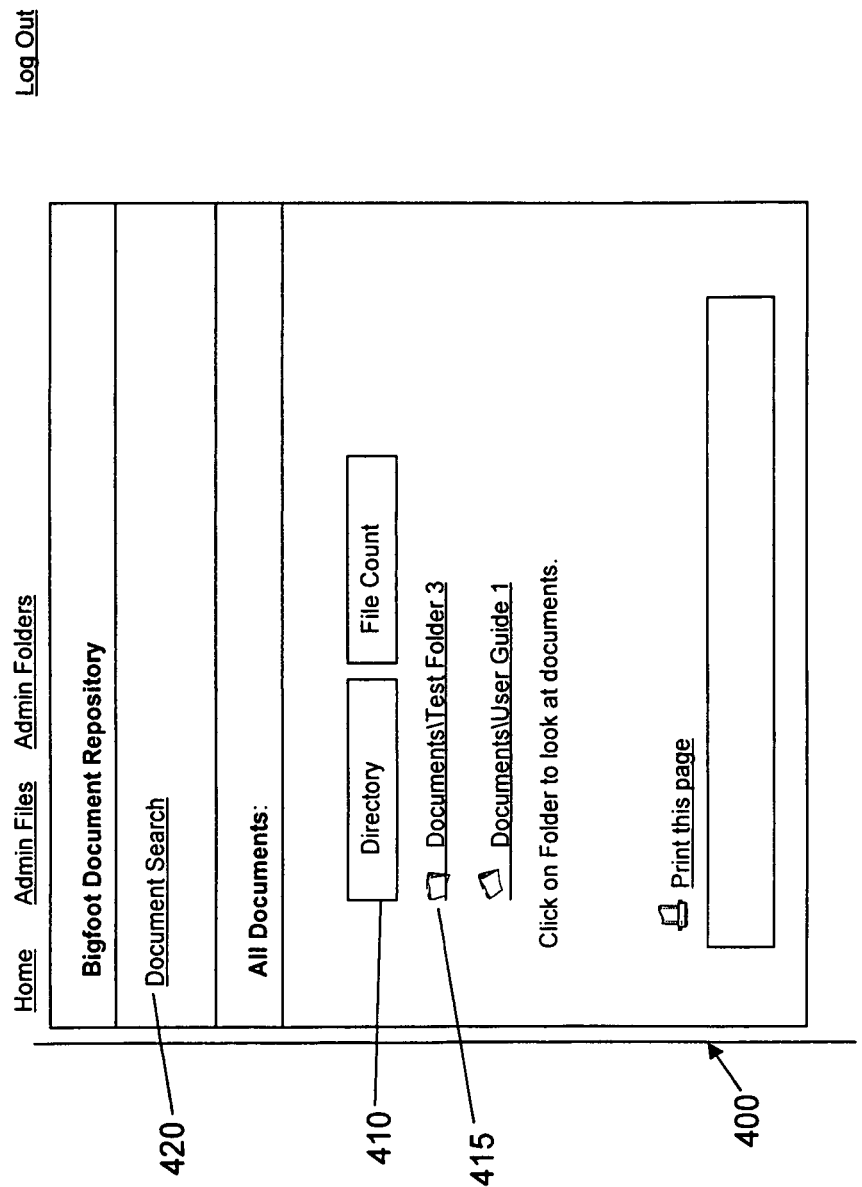
Figure 5:
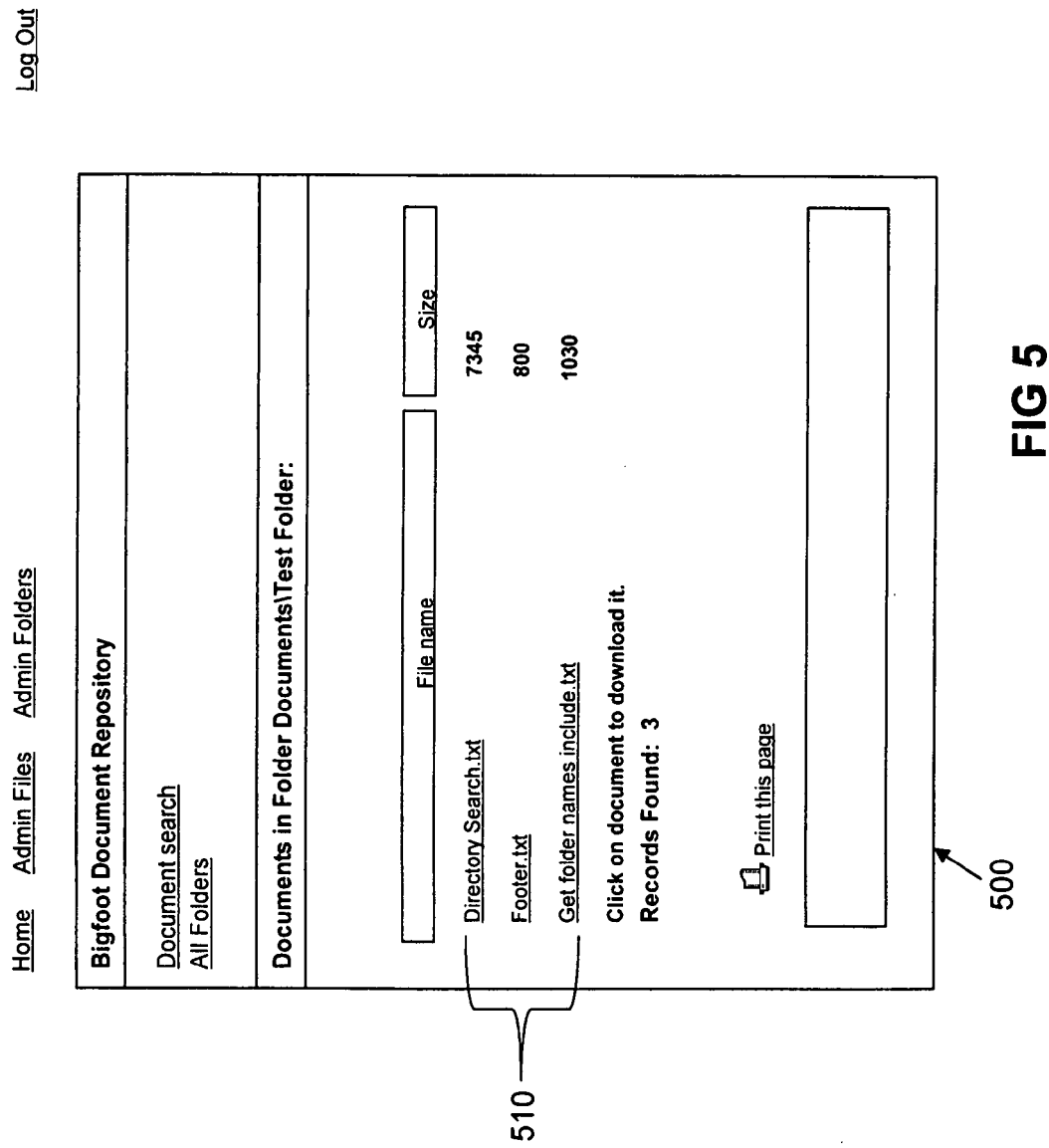

Each folder and/or subfolder 410 includes a link to open and display a list of files in that folder or subfolder. For example, as shown in a view file page GUI 500 of FIG. 5, the "Documents\Test Folder" 410 of FIG. 4 is selected and the contents of that folder and/or subfolder are presented. In some of the embodiment, the view files page 500 lists all of the electronic files 510 in the selected folder and/or subfolder 410. Each electronic file 510 has a name that may be a direct link to open the file itself. That is, using for example, a mouse or other input device to click on the file name to bring up the file in another window.

Figure 6:
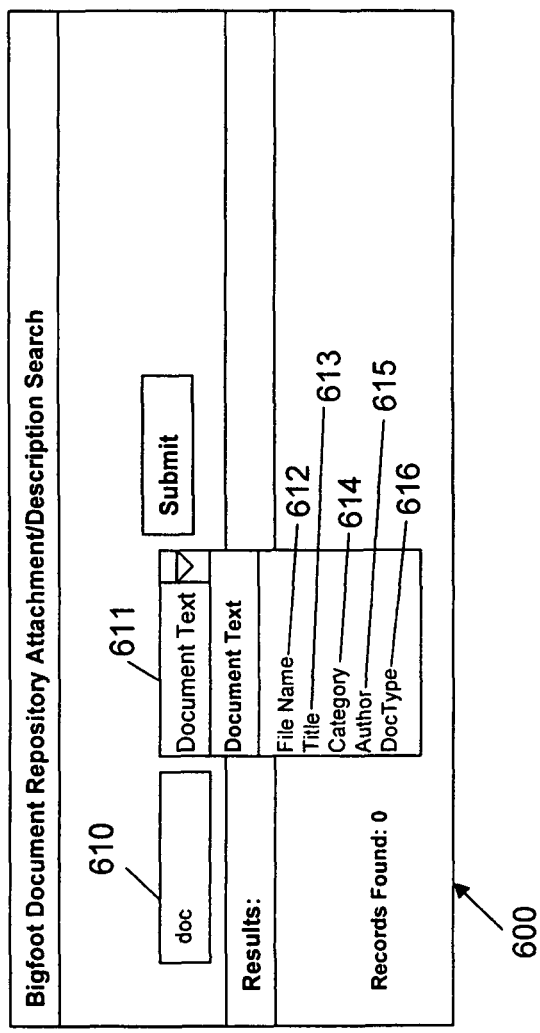

FIG. 6 illustrates the document search GUI 600 that enables the user to search the search repository index 225 by various search parameters, such as a "Document Text" search parameter to search any part of the text of the electronic file, a "File Name" search parameter to search for a portion (or, alternatively an entire) of a file name, a "Title" search parameter to search for a title assigned by an application associated with the electronic file, such as a title assigned to an electronic document created with a MS Office product, a "Category" search parameter to search within a selected portion of the electronic document, such as the abstract (e.g., first 200 characters) of the electronic file, an "Author" search parameter to search for an author of the electronic document, a "Doc Type" search parameter to search for a categorization of the electronic file. Upon searching for the electronic file, if any matches are found, these matches are presented in a matched search results GUI. If the search parameter is not matched, then a GUI that indicates no electronic files were identified matching the search parameter is presented.

Figure 7:
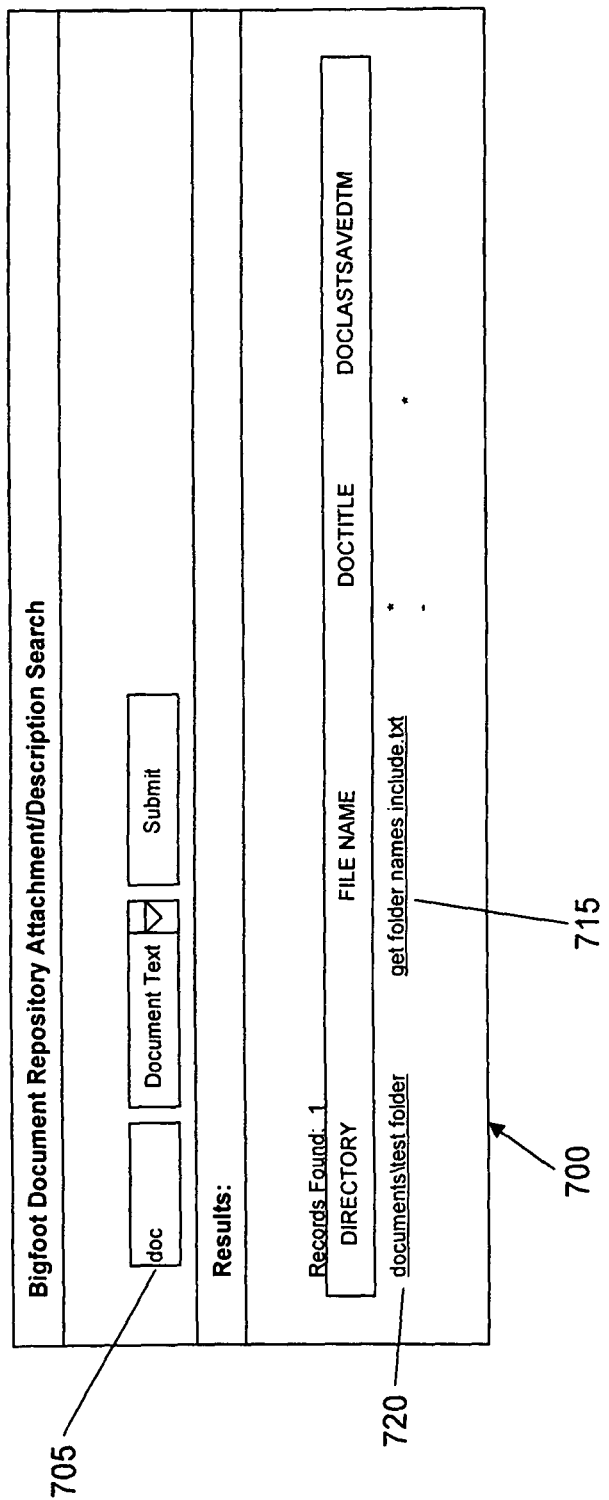

FIG. 7 illustrates an example of the resulting GUI for searching for the electronic file containing the letters "doc" 705. The search returned one result 715 that is displayed with a link to open the electronic file and also with a link to the folder/subfolder 720 to search for other files.

Figure 8:
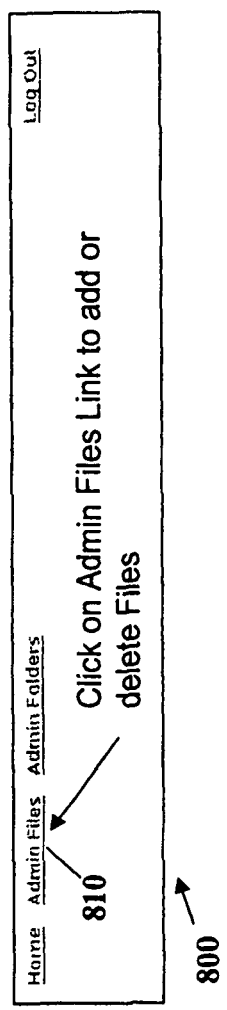
Figure 9:
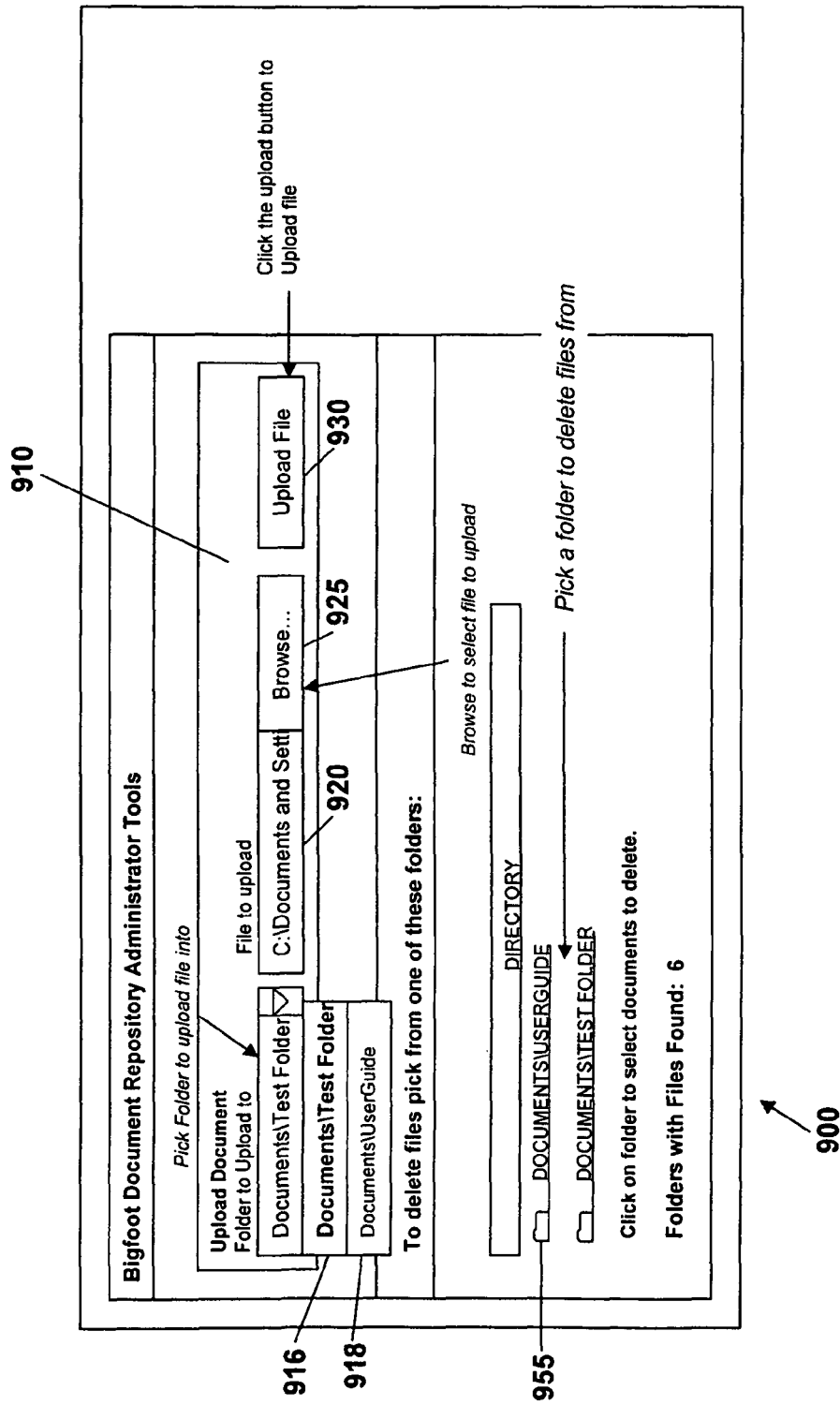

FIG. 8 illustrates an administrative GUI 800 for adding and/or deleting an electronic file and/or an electronic folder and/or subfolder. To add an electronic file, the user may click or otherwise select an "Admin Files" link 810. Upon clicking on the link 810, the administrative files GUI 900 of FIG. 9 is presented. At the top of the administrative files GUI 810, is a template 910 to enter information to add or otherwise upload a selected electronic file 920 to the repository. As illustrated in FIG. 9, to upload the selected electronic file 920, the following steps are performed:
1. Click on the browse button 925 to select the electronic file 920 to upload
2. Select folder 916, 918 to upload (or otherwise copy and/or store) the electronic file into
3. Click on the upload button 930 to upload the file According to some of the embodiments, the upload functionality has an automatic overwrite protection. For example, if the repository finds that the selected electronic file 920 being uploaded already exists, the document repository module 110 appends the date and time to the document to make the selected electronic file 920 distinguishable over the similarly named existing electronic file. This function may also be used as a method to maintain version control. Alternatively, the overwrite protection may be disabled to turn off this function.

Figure 10:
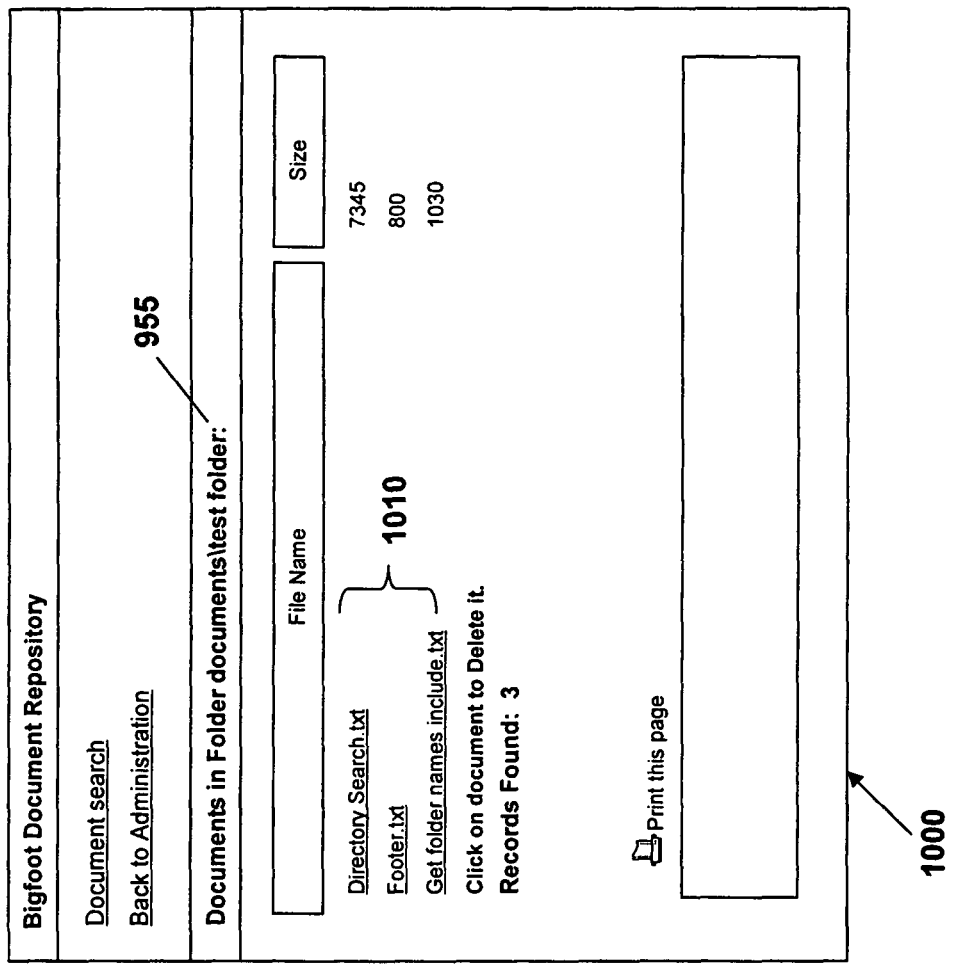
Figure 11:
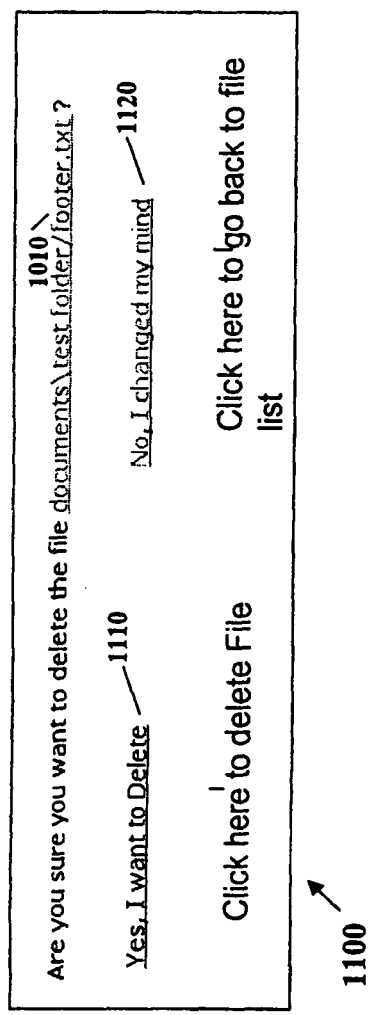

FIG. 9 further illustrates a template 950 for deleting an electronic file. To delete a selected electronic file, the user again clicks or otherwise selects the "Admin Files" link 810. After clicking on that link 810, the administrative GUI 900 is presented with a delete template 950 that identifies a list of folders and/or subfolder 955 of the document repository. The user may then select a folder 955 to delete files from by clicking on a folder name. Next, the document repository module presents an authentication GUI (not shown) and prompts the user to login as administrator with a verified administrative password. After the user successfully logs in with the administrator password, the user may delete one or more electronic files. For example, FIG. 10 illustrates a list of electronic files in the selected folder and/or subfolder 955. The user may then click or otherwise select one or more of the electronic files 1010 for deletion. Prior to deleting the selected electronic file, the delete confirmation GUI 1100 of FIG. 11 is presented. If the user confirms deletion of the selected electronic file 1010 by selecting the "Yes, I want to Delete" button 1110, then the selected electronic file 1010 is erased. If, however, the user selects the "No, I change my mind" button 1120, then the selected electronic files is not erased.

Figure 12:
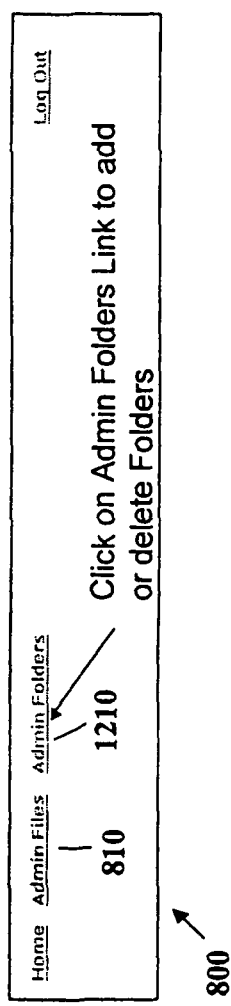
Figure 13:
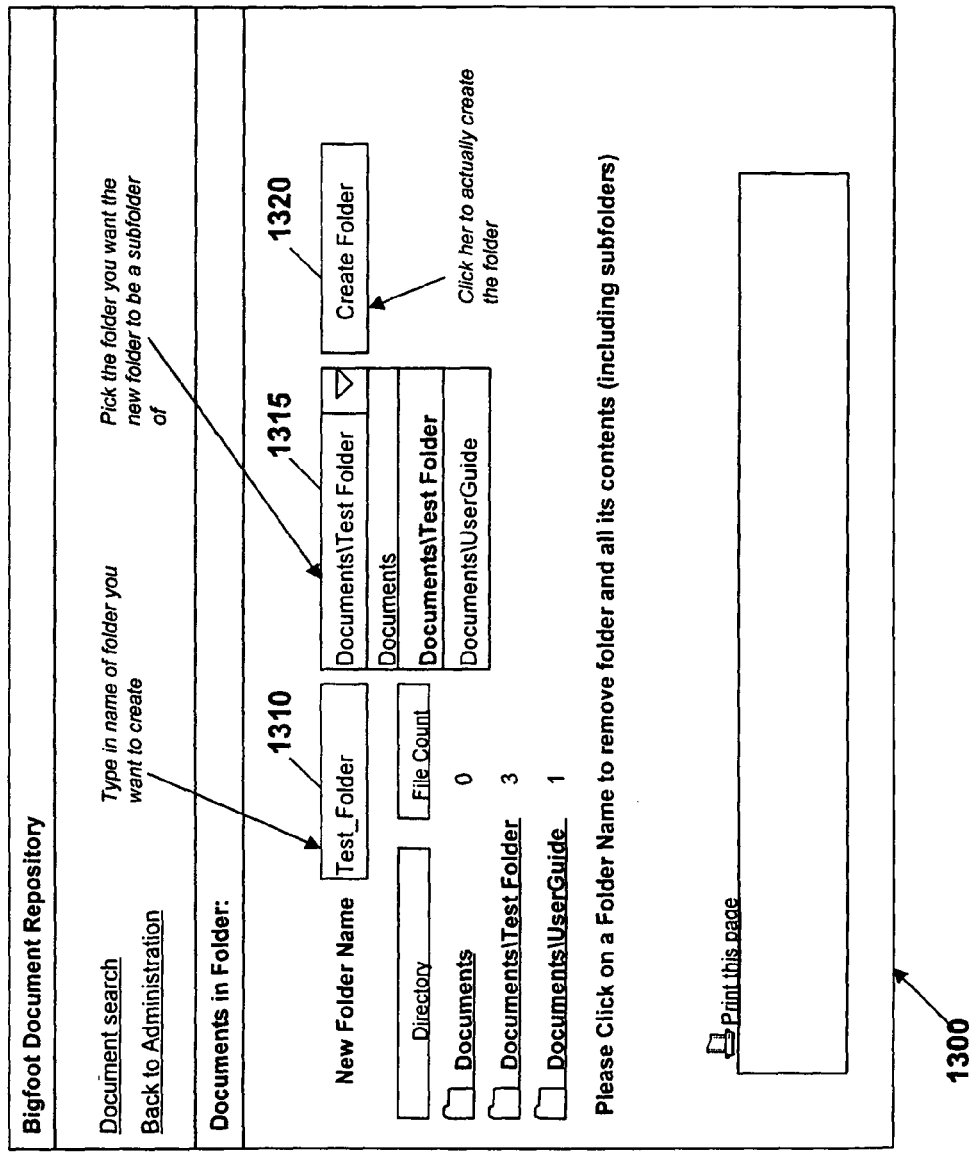

To add or delete an electronic folder and/or subfolder, the user accesses the administrative GUI 800 of FIG. 8 and clicks on or otherwise selects the "Admin Folder" link 1210 shown in FIG. 12. Upon clicking on the "Admin Folder" link 1210, the administrative folder GUI 1300 of FIG. 13 is presented. The administrative folder GUI 1300 is an administrative screen and the user is prompted to login with an administrator password to enable administrative functionality (unless the user has previously logged in as an administrator). To create a new folder and/or subfolder, the following steps are performed:
1. Input the name of the new folder in an input folder name capture field 1310.
2. Select a folder 1315 from the pull down menu to select the folder and create this as a subfolder.
3. Click on the "Create Folder" button 1320.

Figure 14:

After clicking on the "Create Folder" button 1320, the folder is created and the list of folders is updated and an updated administrative folder GUI 1400 is presented to the user as shown in FIG. 14.

Figure 15:
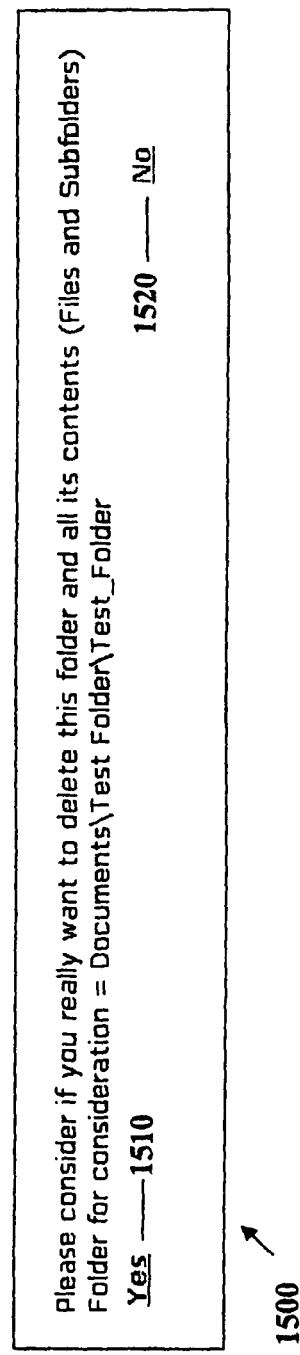
Figure 16:
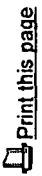

To delete an electronic folder and/or subfolder, the user clicks on or otherwise selects a name of a folder and subfolder to identify for deletion. For example, if the user wanted to delete "Documents\Test Folder\Test Folder" 1420, then the user clicks on this name. Prior to deleting the selected electronic folder and/or subfolder, the delete confirmation GUI 1500 of FIG. 15 is presented. If the user confirms deletion of the selected subfolder 1420 by selecting the "Yes" button 1510, then the selected electronic subfolder 1420 is erased and the updated list of folders and subfolders is presented in an updated administrative folders GUI 1600 with the updated list of folder and subfolders as shown in FIG. 16. If, however, the user selects the "No" button 1520, then the selected electronic subfolder is not erased.

Figure 17:
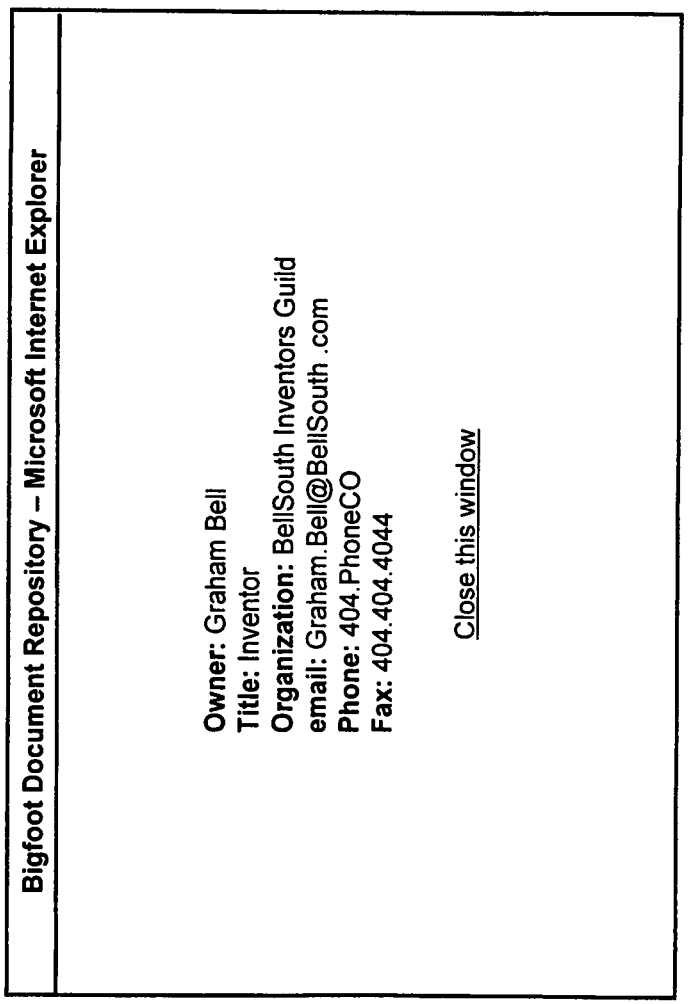

FIG. 17 illustrates a move/rename folder GUI 1700 that allows the administrative user to rename a folder and or subfolder and tom move or re-organize folders and/or subfolders. The user selects the folder or subfolder 1712, 1714, 1717, 1718 from the displayed list of directory folders and subfolders 1710, and the selected folder/subfolder is populated in the "Folder to Rename" field 1720. Next, the user inputs the new name of the folder and/or subfolder in the "New Name For Folder" field 1730 and clicks on the "Rename Folder" button 1740. Thereafter, the folder is renamed according to the new name.

Figure 18:
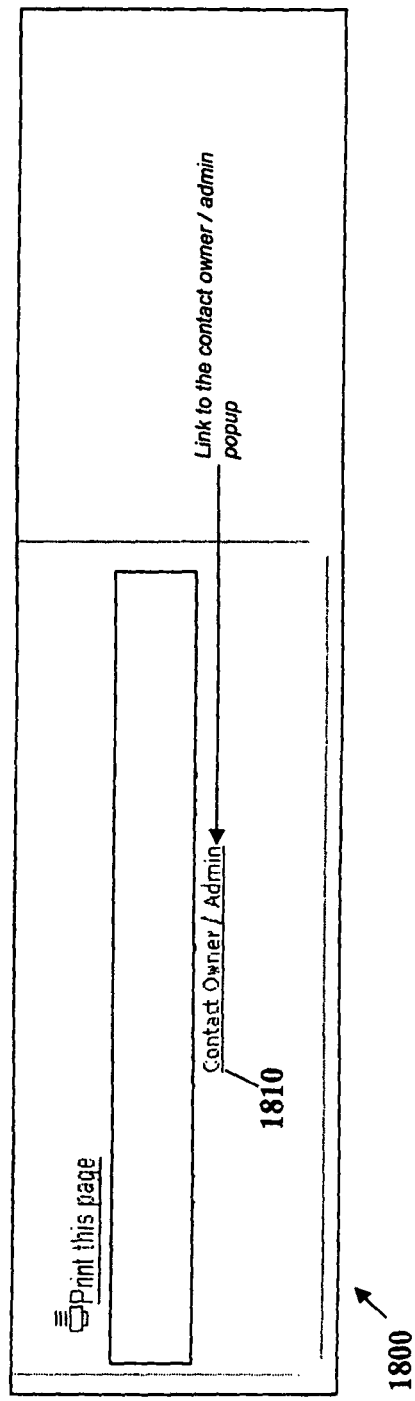

According to another exemplary embodiment, a contact GUI 1700 may be provided with information 1710, 1720, 1730, 1740, 1750, and 1760 with details identifying and providing contact information to an administrator (or alternate contact, such as, for example, technical support) as shown in FIG. 17. FIG. 18 illustrates a generic GUI 1800 to show that a link to the contact GUI 1700 (or popup) may be available on any of the GUIs discussed herein.

Figure 19:
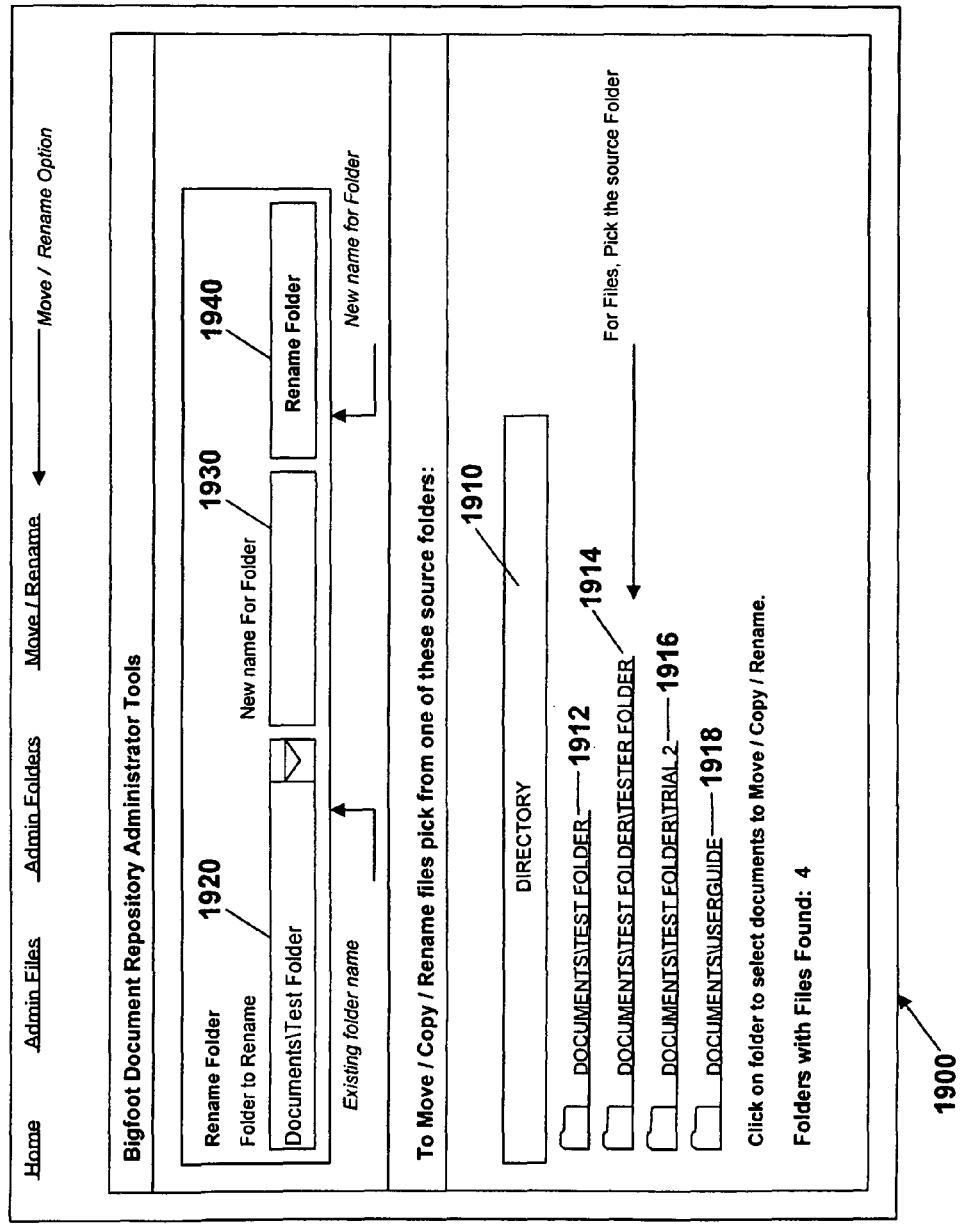

FIG. 19 illustrates a move/rename file GUI 1900 that allows the administrative user to rename and/or move a selected electronic file, folder, and/or subfolder. To rename a folder and/or subfolder, the user selects the source folder and/or subfolder from the pull down menu of a "Folder to Rename" field 1920. Next, the user inputs the new name of the folder and/of subfolder in the "New Name for Folder" field 1930 and clicks on the "Rename Folder" button 1940. Thereafter, the folder and/or subfolder are renamed according to the new name.

Figure 20:
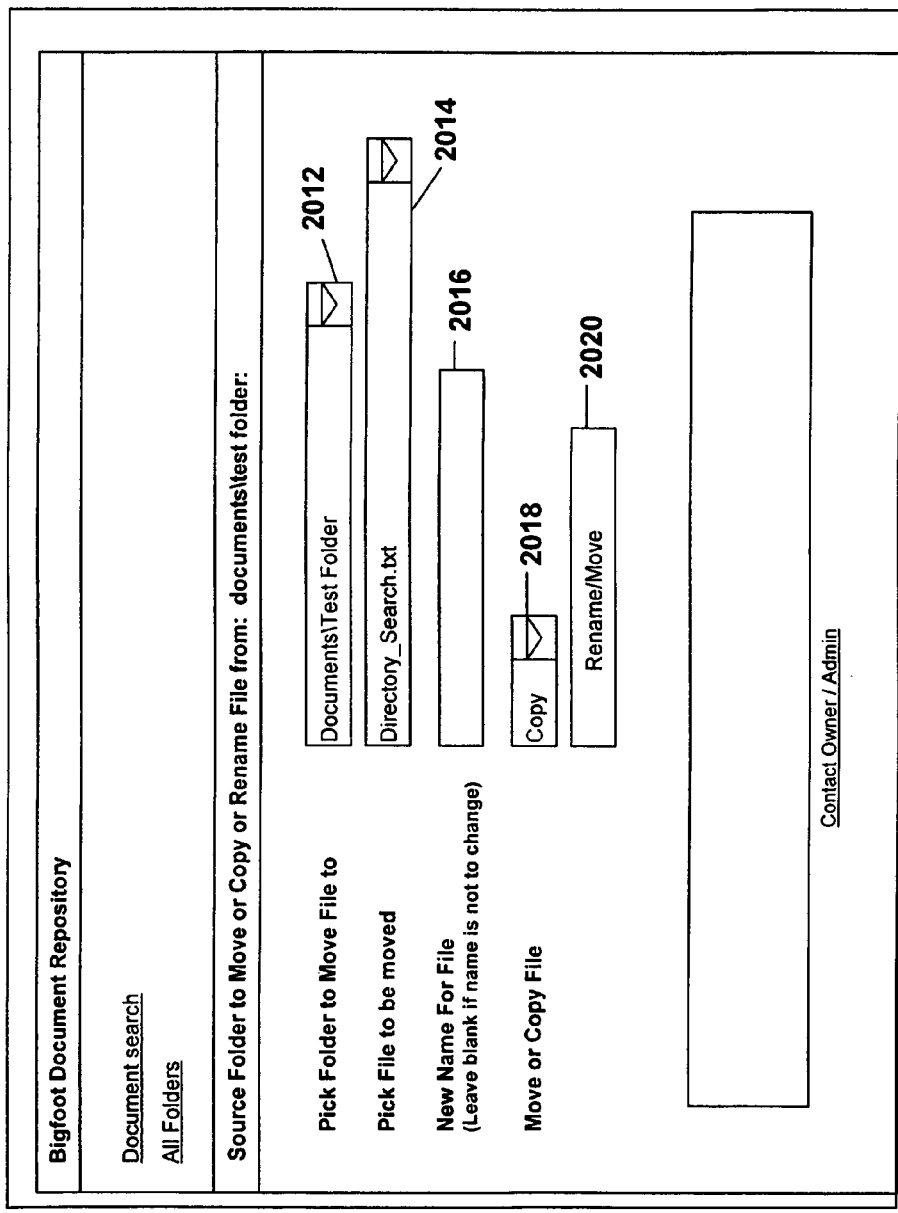
Figure 21:
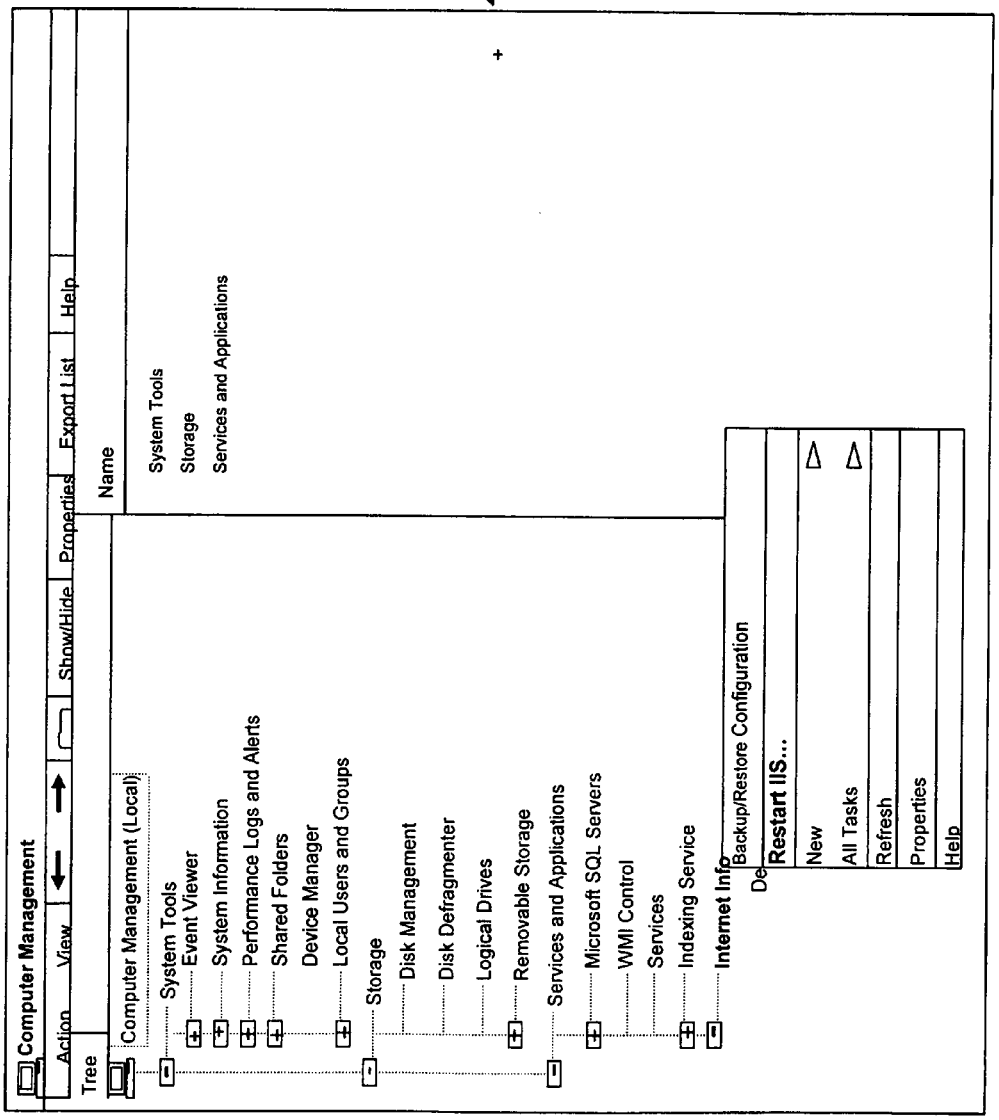

To move, copy, and/or rename a selected electronic file, the user again accesses the move/rename file GUI 1900 and selects and clicks on a source folder and/or subfolder 1912, 1914, 1919, 1918 from the displayed list of directory folders and subfolder 1910. Next, the source folder to move or copy of rename GUI 2000 of FIG. 20 is presented. To move or copy or rename the file, the following steps are performed:

1. Select the destination folder for the selected electronic file (or subfolder) to be moved or copied to in the "Pick the Folder to Move File to" field 2012. In the case of a simple rename, select the same folder as the destination folder.
2. Select the name of the file to be moved from the pull down menu of the "Pick File to be moved" filed 2014.
3. Input the new name and extension (e.g., .doc, .ppt, .pdf) for the selected file in the "New Name for File" field 2014.
4. Select the copy option of the move option from the "Move or Copy File" field 2018. The copy/move option allows the user to select if whether the source file is copied to the new destination folder (with the source file remaining in the source folder and/or subfolder) or whether the source file is moved out of the source folder and/or subfolder (with no source file existing in the source folder and/or subfolder).
5. Click on the "Rename/Move" button 2020 to execute renaming and/or moving the source file.

To rename a source file, the user may select the same source folder for the destination folder, type in the new file name, and select the move option. To copy a source file, the user may select a different destination folder and select the copy option. And, to move a file, the user may select a different destination folder and select the move option.

Each of the above described GUIs, may also contain a link to a user's guide document that provides technical explanations, instructions, tests, and troubleshooting guidelines. If the administrator or another authorized user needs to update the user's guide, the user's guide document may be opened from a main folder, such as a Kbase type folder 2100 shown in FIG. 21. According to the embodiment of FIG. 21, if the administrator wants to update the user's guide document, the administrator could open up the file named "UserGuide.doc" in the main folder, make any updates, and save the file with the same file name (or, an alternative file name) to incorporate the updates.

Further, each of the above described GUIs, may also contain a logout option and/or button (not shown) that allows the user to logout of the document repository module 110. Logging out prevents unauthorized access of the document repository module 110 may be helpful to prevent access should the user leave his/her computer 100 and/or communications device 202. Alternatively, the user may logout of the document repository module 110 by closing the browser window.

In order to download or otherwise install the document repository and/or document repository module, according to an exemplary embodiment, the following steps may be performed as described with reference to FIGS. 22-27. This exemplary embodiment makes use of Internet Information Services (IIS) and Microsoft Office applications. However, those skilled in the art understand that the program, processes, methods, and systems described herein are not limited to any particular application or software product of a manufacturer.

Figure 22:
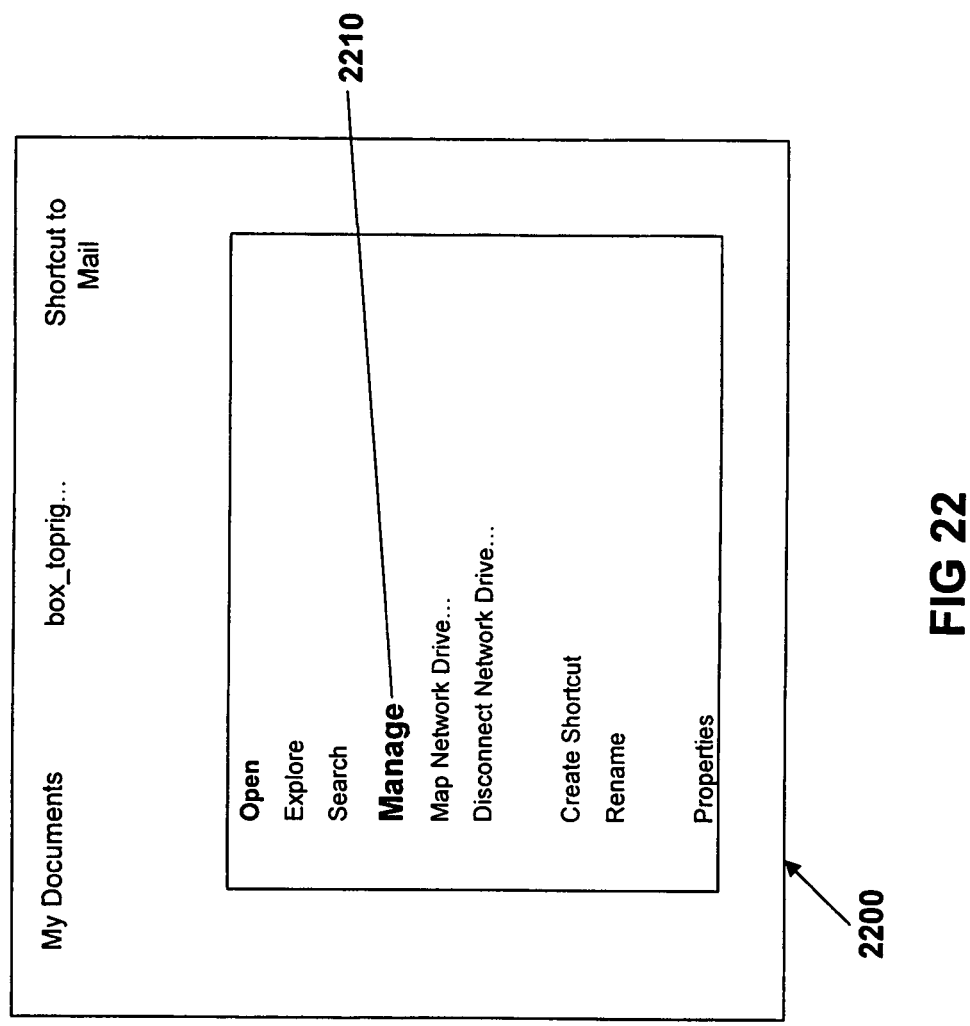
Figure 23:
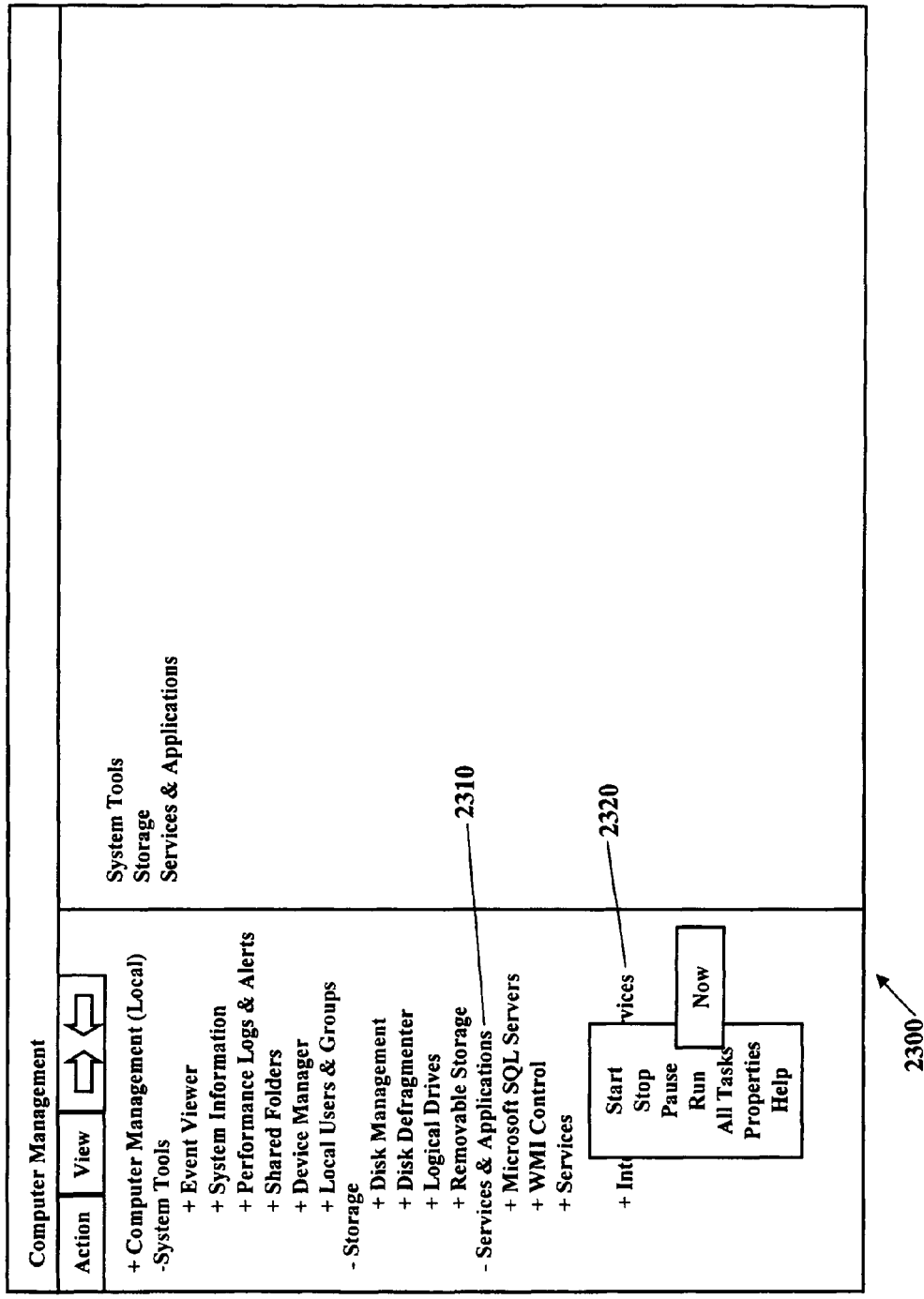
Figure 24:
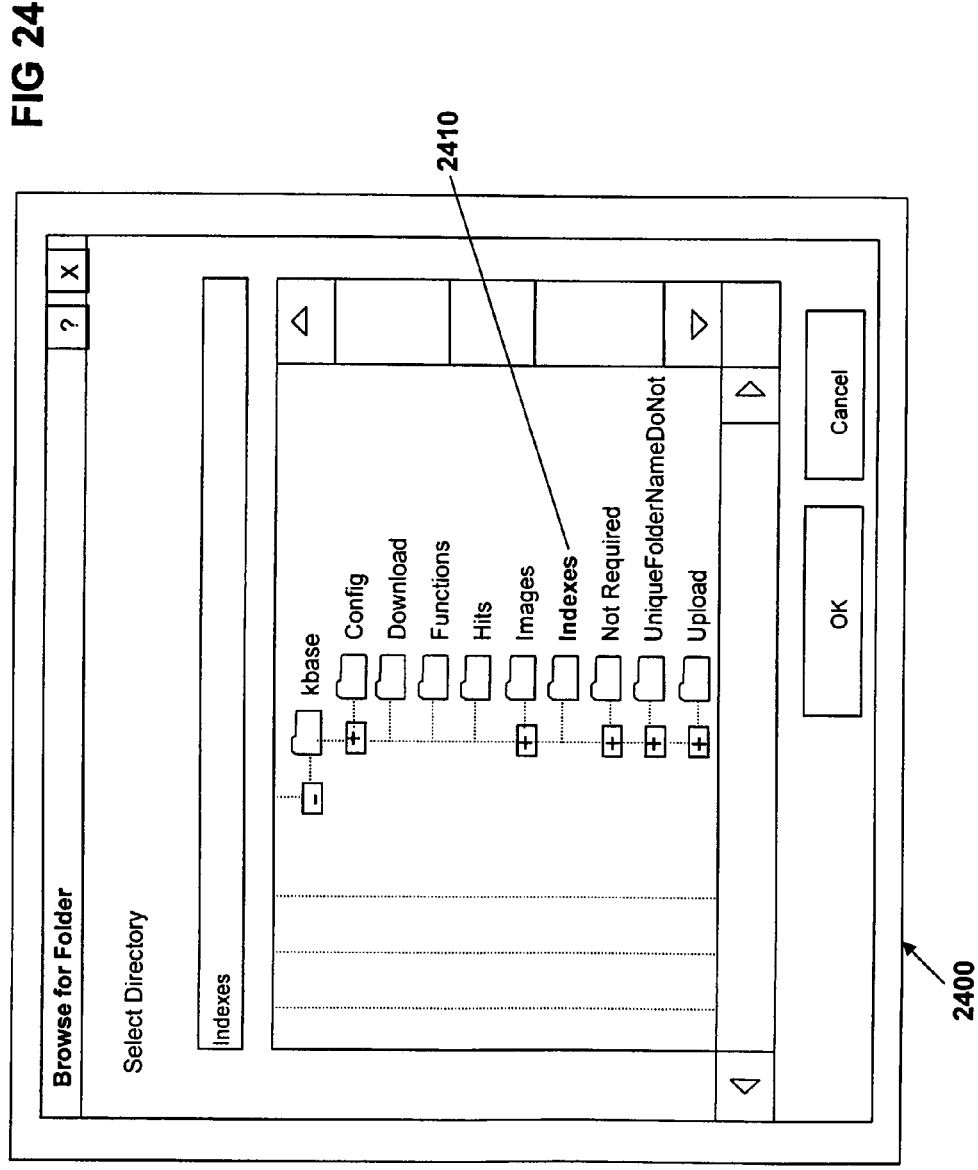
Figure 26:
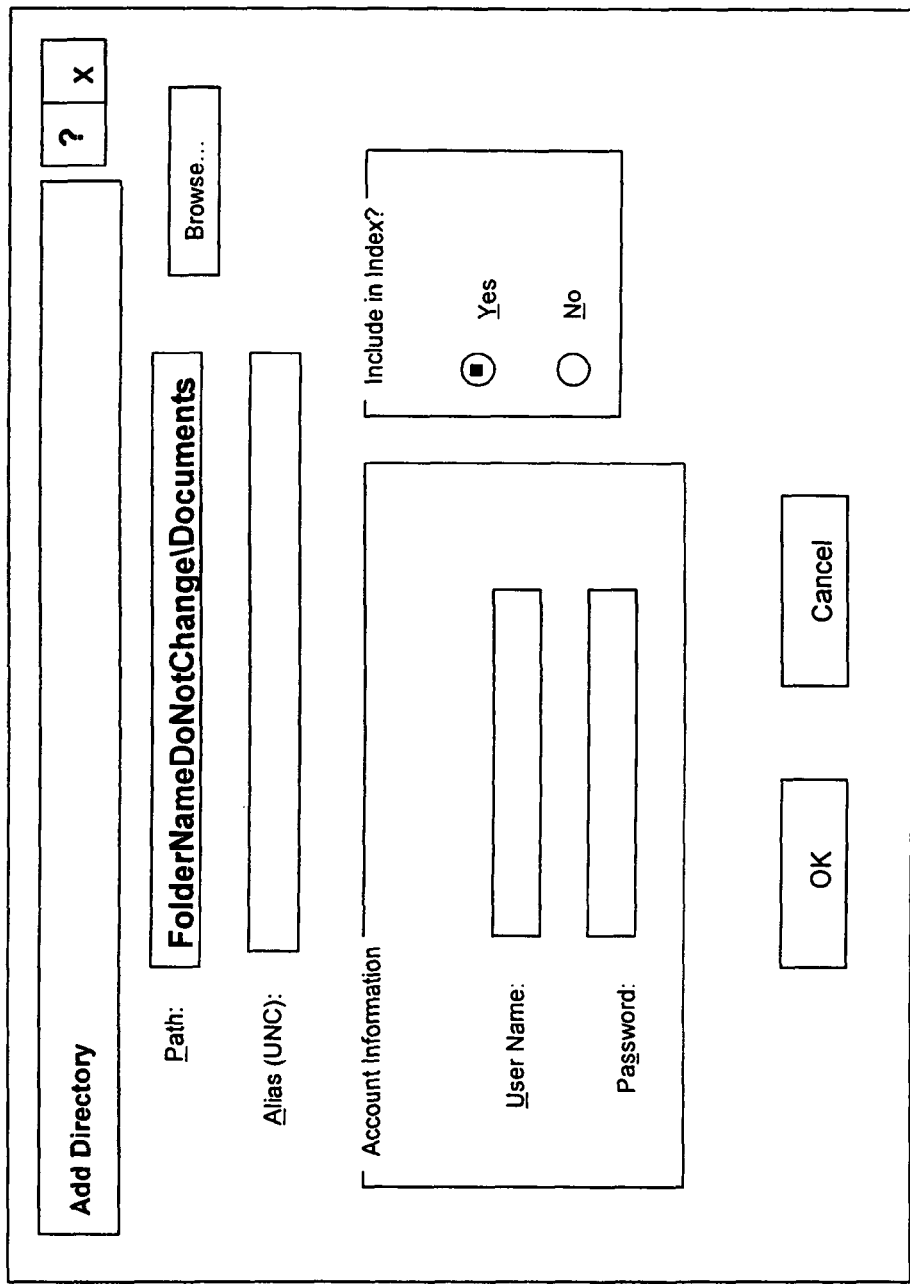
Figure 27:
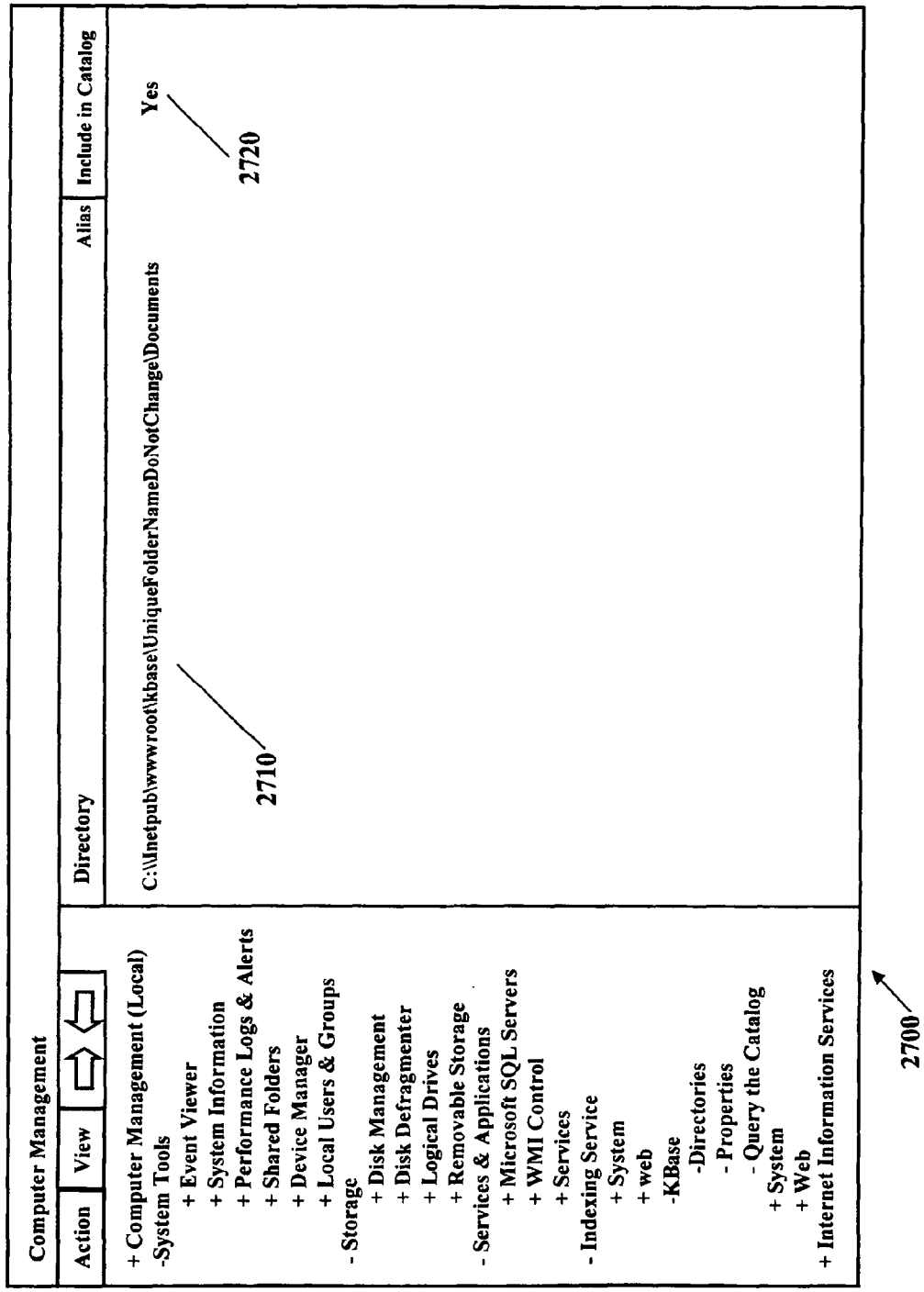

1) Ensure that internet information services application is activated.
   a) Right click on "My Computer" icon (not shown) and click on Manage field 2210 shown in FIG. 22.
   b) Expand Services and Applications field 2310 shown in FIG. 23.
   c) Right click on Internet Information Services field 2320 and verify there is a Restart IIS field (not shown). The Restart IIS field ensures that IIS is activated. If a Start IIS field (not shown) is presented, then click on the Start IIS field to activate IIS.
   d) Close the Computer management console when you are done with this step
2) Download the document repository package (referred to as Kbase in this example) and unzip the program to a location accessible by the organization's world wide communications or web server.
   a) For example, the document repository package may be saved under a default Windows web folder, such as, for example, "c:\Inetpub\wwwroot". Upon unzipping, the folder structure 2400 of FIG. 4 is created and presented
   b) To validate this location, the user may click on a link http://localhost/kbase/ (not shown) that pops up or otherwise displays the login GUI 300.
   c) If a default location is selected, then the user should ensure the default location is accessible using an URL and should use that URL to validate that the login GUI 300 pops up.
3) Create an index server catalog that can search the document repository. This example uses a folder named "UniqueFolderNameDoNotChangeunder" the main kbase folder that locally stores the electronic documents. Alternatively, the electronic documents may be remotely stored.
   a) Right click on "My Computer" icon (not shown) and click on Manage field 2210 shown in FIG. 22.
   b) Expand Services and Applications field 2310 shown in FIG. 23.
   c) Right click on Indexing Service field 2505 shown in FIG. 25.

d) Right click on "New" field 2510 and select "Directory" option 2520 to create the document repository catalog in the \kbase\Indexes folder 2410 shown in FIG. 24.

e) Add selected folders and/or subfolders as shown on the Add Directory GUI 2600 of FIG. 26. If the folder and/or subfolder is successfully added to the document repository, then the selected folder and/or subfolder name 2710 is shown in the GUI of FIG. 27 along with an indication of "Yes" 2720 or "No" (not shown) to include in the catalog (e.g., index)

Figure 25:
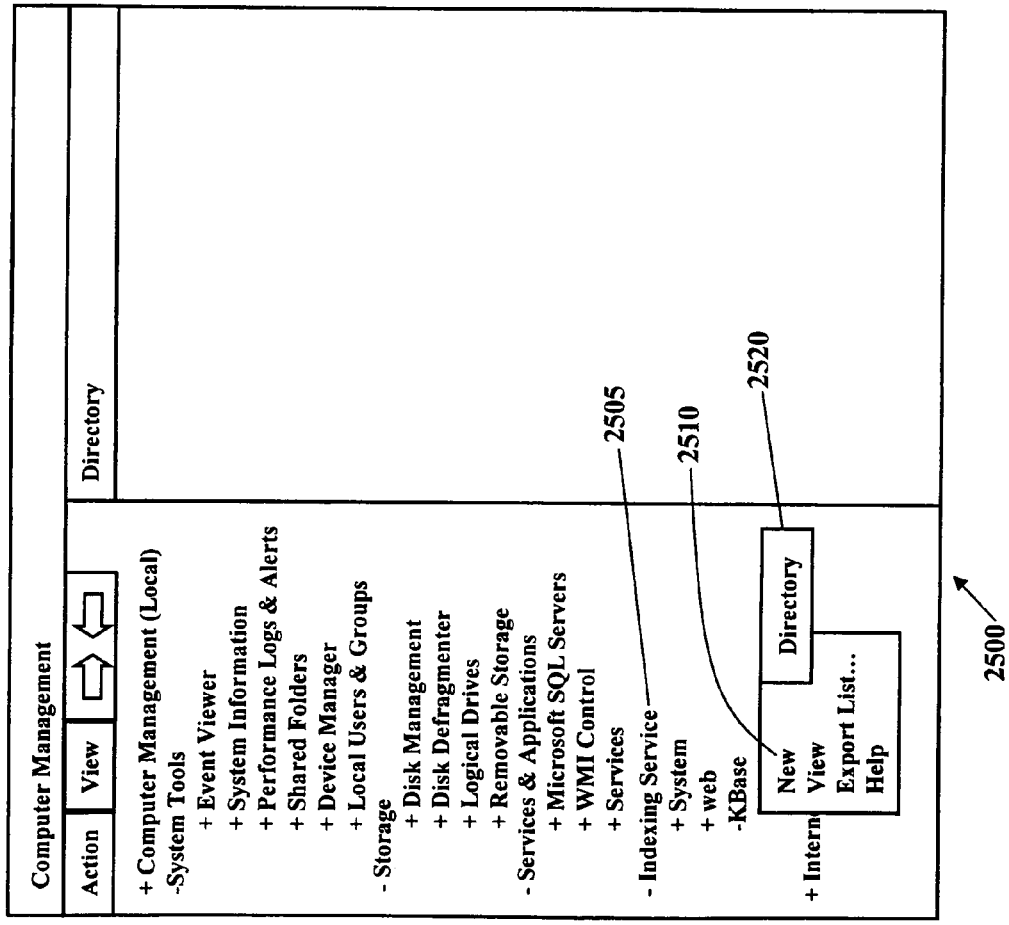

4) Start (or re-start) the indexing by clicking on the Indexing Service field 2505 shown in FIG. 25 and then click on "Start" (not shown).

5) Configure the document repository module by opening up the configuration file in a text editor, such as, for example, Notepad/Textpad and edit the fields.

The document repository module (shown as reference numeral 110 in FIGS. 1-2) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mentioned here but considered within the scope of this invention, allow the document repository module to be easily disseminated.

Still in further exemplary embodiments, the document repository module may be physically embodied on or in any addressable (e.g., HTTP, I.E.E.E. 802.11, Wireless Application Protocol (WAP)) wireless device capable of engaging in a session initiation protocol communication or other similar communication. Examples could include a computer, a wireless personal digital assistant (PDA), an Internet Protocol phone, and/or a wireless pager.

While several exemplary implementations of embodiments of this invention are described herein, various modifications and alternate embodiments will occur to those of ordinary skill in the art. For example, the document repository module may include a filter tool to convert an electronic file from one format, such as Hyper-Text Transfer Protocol (HTTP), to another format, such as such as URL formats, Extensible Style Sheet (XSL) formats, Real Simple Syndication (RSS) that uses XML structures, and then the document repository module may search for parameters within the converted file. Accordingly, this invention is intended to include those other variations, modifications, and alternate embodiments that adhere to the spirit and scope of this invention.

What is claimed is:

1. A method, comprising:
    associating an electronic file to a document repository stored in memory of a communications device;
    associating the electronic file to a changeable subfolder hierarchically within an unchangeable primary folder in the memory;
    extracting data from the electronic file;
    creating a document repository index from the data extracted from the electronic file, the document repository index associating a file name of the electronic file to an author name of an author of the electronic file and to a manager name of a manager of the author;
    associating the document repository index to the unchangeable primary folder;
    determining another file in the document repository has a similar file name; and
    implementing an overwrite protection function in response to the similar file name that appends a date and time of upload to the electronic file, such that the date and time of the upload to the document repository distinguishes the electronic file from other electronic files uploaded to the document repository.

2. The method of claim 1, wherein extracting the data from the electronic file comprises extracting the file name of the electronic file.

3. The method of claim 1, wherein extracting the data from the electronic file comprises extracting a storage location where the electronic file is electronically stored.

4. The method of claim 1, wherein extracting the data from the electronic file comprises extracting a title of the electronic file.

5. The method of claim 1, wherein extracting the data from the electronic file comprises extracting the manager name of the manager from the electronic file.

6. The method of claim 1, further comprising automatically creating an abstract of the electronic file.

7. The method of claim 1, further comprising:
    receiving a search parameter to search the document repository index for the search parameter;
    communicating a search result when the search parameter matches data in the document repository index; and
    communicating an unsuccessful search result when the search parameter does not match the data in the document repository index.

8. The method of claim 7, further comprising retrieving a matching electronic file that matches the search parameter.

9. The method of claim 8, further comprising sending a query to an internet protocol communications address to retrieve the matching electronic file.

10. The method of claim 8, wherein receiving the search parameter comprises receiving a character count describing a number of characters.

11. The method of claim 8, wherein receiving the search parameter comprises receiving a print time that a document was previously printed.

12. The method of claim 8, wherein receiving the search parameter comprises receiving a characterization that was automatically created by the document repository.

13. The method of claim 8, wherein receiving the search parameter comprises receiving a hidden count parameter describing a number of hidden slides in the electronic file.

14. The method of claim 8, wherein receiving the search parameter comprises receiving a paragraph parameter describing a number of paragraphs in the electronic file.

15. A system, comprising:
    a processor; and
    memory storing code that when executed causes the processor to perform operations, the operations comprising:
    associating an electronic file to a document repository;
    associating the electronic file to a changeable subfolder hierarchically within an unchangeable primary folder in the memory;
    extracting data from the electronic file;
    creating a document repository index from the data extracted from the electronic file, the document repository index allowing access to the electronic file from a communications device;
    associating the document repository index to the unchangeable primary folder, such that a hierarchical file structure is //unchangeableprimaryfolder/electronicfile;

associating, in the document repository index, a file name of the electronic file to an author name of an author of the electronic file and to a manager name of a manager of the author; and implementing an overwrite protection function in response to the similar file name that appends a date and time of upload to the electronic file, such that the date and time of the upload distinguishes the electronic file from other electronic files uploaded to the document repository.

16. A computer readable memory storing processor executable instructions that when executed cause a processor to perform operations, the operations comprising:

associating an electronic file to a document repository;

associating the electronic file to a changeable subfolder hierarchically within an unchangeable primary folder;

extracting data from the electronic file;

creating a document repository index from the data extracted from the electronic file, the document repository index associating a file name of the electronic file to an author name of an author of the electronic file and to a manager name of a manager of the author;

associating the document repository index to the unchangeable primary folder, such that a hierarchical file structure is //unchangeableprimaryfolder/electronicfile;

determining another file in the document repository has a similar file name; and implementing an overwrite protection function in response to the similar file name that appends a date and time of upload to the electronic file, such that the date and time of the upload to the document repository distinguishes the electronic file from other electronic files uploaded to the document repository.

* * * * *